(12) United States Patent
Libow et al.

(10) Patent No.: US 10,587,719 B2
(45) Date of Patent: *Mar. 10, 2020

(54) UPDATING A PROFILE

(71) Applicant: International Business Machines Corporation, Armonk, NY (US)

(72) Inventors: Eric B. Libow, Raleigh, NC (US); Walker L. Sherk, Raleigh, NC (US); Thomas S. Wallace, Hillsborough, NC (US); Pu Yang, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/450,764

(22) Filed: Jun. 24, 2019

(65) Prior Publication Data
US 2019/0312951 A1 Oct. 10, 2019

Related U.S. Application Data

(63) Continuation of application No. 16/446,377, filed on Jun. 19, 2019, which is a continuation of application
(Continued)

(51) Int. Cl.
| | | |
|---|---|---|
| H04L 29/08 | (2006.01) | |
| H04L 12/58 | (2006.01) | |
| G06Q 50/00 | (2012.01) | |

(52) U.S. Cl.
CPC ......... *H04L 67/306* (2013.01); *H04L 51/32* (2013.01); *H04L 67/22* (2013.01); *G06Q 50/01* (2013.01); *H04L 67/06* (2013.01)

(58) Field of Classification Search
CPC ......... G06Q 50/01; H04L 51/32; H04L 67/06; H04L 67/22; H04L 67/306
See application file for complete search history.

(56) References Cited

U.S. PATENT DOCUMENTS

| | | |
|---|---|---|
| 7,853,881 B1 | 12/2010 | Aly Assal |
| 8,244,848 B1 | 8/2012 | Narayanan |
| (Continued) | | |

OTHER PUBLICATIONS ip.com; Prior Art Database; Targeted Social Networking Profile Update Suggestions; IP.com Disclosure No. IPCOM000238766D; Publication Date: Sep. 17, 2014; p. 1; abstract only.
(Continued)

*Primary Examiner* — Jerry B Dennison
(74) *Attorney, Agent, or Firm* — Fabian VanCott; Steven L. Nichols

(57) ABSTRACT

Updating a profile includes monitoring electronic communications between a target user and a number of other users in real-time, extracting communicated information available about the target user and the number of other users from the electronic communications, based on an analysis of the communicated information available about the target user and the number of other users identifying relevant information from the communicated information that is relevant for updating the profile of the target user on at least one social network, and updating the profile of the target user on the at least one social network using the relevant information derived from the analysis.

17 Claims, 7 Drawing Sheets

Related U.S. Application Data

No. 15/399,554, filed on Jan. 5, 2017, which is a continuation of application No. 14/939,351, filed on Nov. 12, 2015, now abandoned.

(56) References Cited

U.S. PATENT DOCUMENTS

| | | |
|---|---|---|
| 8,312,056 B1 | 11/2012 | Peng |
| 8,402,024 B2 | 3/2013 | White |
| 9,208,509 B1* | 12/2015 | Curran ............... G06Q 30/0254 |
| 9,245,257 B2 | 1/2016 | McConnell |
| 2008/0172359 A1* | 7/2008 | Lundell ................... G10L 15/22 |
| 2009/0234796 A1* | 9/2009 | Cropper ................. G06Q 30/02 |
| 2009/0282002 A1 | 11/2009 | Reeder |
| 2010/0235886 A1* | 9/2010 | Muller ................... G06Q 30/02 726/4 |
| 2011/0113096 A1* | 5/2011 | Long ..................... G06Q 30/02 709/204 |
| 2011/0137856 A1* | 6/2011 | Jana ....................... G06Q 10/10 707/609 |
| 2011/0145192 A1* | 6/2011 | Quintela ............. G06F 16/9535 707/623 |
| 2011/0191337 A1* | 8/2011 | Cort ........................ G06F 3/048 707/728 |
| 2011/0196927 A1* | 8/2011 | Vance ................... G06Q 10/107 709/204 |
| 2012/0078906 A1 | 3/2012 | Anand |
| 2012/0089678 A1* | 4/2012 | Cort ....................... G06Q 50/01 709/204 |
| 2012/0089690 A1* | 4/2012 | Hein ..................... G06Q 10/10 709/206 |
| 2012/0215861 A1* | 8/2012 | Smith ..................... H04L 51/12 709/206 |
| 2013/0091217 A1* | 4/2013 | Schneider ............. G06Q 50/01 709/204 |
| 2013/0104070 A1 | 4/2013 | Blake |
| 2013/0110641 A1 | 5/2013 | Ormont |
| 2014/0067930 A1 | 3/2014 | Berdichevsky |
| 2014/0089320 A1 | 3/2014 | Baldwin |
| 2014/0214936 A1 | 7/2014 | Abraham |
| 2014/0310037 A1* | 10/2014 | Griffin ............... G06Q 10/0631 705/7.12 |
| 2014/0310346 A1 | 10/2014 | Deng |
| 2014/0351230 A1* | 11/2014 | Jana ....................... G06Q 10/10 707/694 |
| 2015/0032873 A1* | 1/2015 | Chen ..................... H04L 67/306 709/224 |
| 2015/0172394 A1 | 6/2015 | Lapenna |
| 2015/0237161 A1 | 8/2015 | Young |
| 2015/0341965 A1* | 11/2015 | Spencer ................ H04W 12/06 370/338 |
| 2016/0005001 A1 | 1/2016 | Muhammedali |
| 2016/0164982 A1* | 6/2016 | LeBeau ................. G06Q 50/01 709/204 |
| 2016/0323411 A1* | 11/2016 | Lee ....................... H04L 67/306 |
| 2016/0381154 A1 | 12/2016 | Apreleva |
| 2017/0032471 A1 | 2/2017 | Ayenew |
| 2017/0039637 A1* | 2/2017 | Wandelmer .......... G06Q 40/025 |
| 2017/0140401 A1 | 5/2017 | Muraoka |
| 2017/0142220 A1* | 5/2017 | Libow .................... H04L 67/22 |
| 2017/0142222 A1* | 5/2017 | Libow ................... H04L 67/306 |
| 2017/0148196 A1 | 5/2017 | Muraoka |
| 2017/0178157 A1 | 6/2017 | Jayaram |
| 2017/0185910 A1 | 6/2017 | Appel |
| 2017/0270210 A1 | 9/2017 | Padmanabhan |
| 2017/0372265 A1 | 12/2017 | Quintela |
| 2018/0032616 A1 | 2/2018 | Wang |
| 2018/0040059 A1 | 2/2018 | Cruz |
| 2018/0103052 A1 | 4/2018 | Choudhury |
| 2018/0109486 A1 | 4/2018 | Liu |
| 2018/0234545 A1* | 8/2018 | Barak ................ G06Q 30/0201 |
| 2019/0312951 A1* | 10/2019 | Libow .................... H04L 67/22 |

OTHER PUBLICATIONS

List of IBM Patents or Patent Applications Treated as Related; Jun. 24, 2019; pp. 1-2.

\* cited by examiner

UPDATING A PROFILE

BACKGROUND

A social network is a network based application to enable a person to create a user account. Once the user account is created, the user establishes connections with other users, such as friends, family, and colleagues in an online environment. The users may then collaborate with each other on the social network or over various electronic mediums including electronic mail (email) and chats by uploading pictures, sharing posts, sending messages, updating status information, and commenting on information posted by others, among other activities.

BRIEF SUMMARY

A method for updating a profile, the method includes, with a computer having a network interface and programmed to perform the method, monitoring electronic communications between a target user and a number of other users in real-time, extracting communicated information available about the target user and the number of other users from the electronic communications, based on an analysis of the communicated information available about the target user and the number of other users identifying relevant information from the communicated information that is relevant for updating the profile of the target user on at least one social network, and updating the profile of the target user on the at least one social network using the relevant information derived from the analysis.

A system for updating a profile includes a first server to monitor electronic communications between a target user and a number of other users in real-time, an extracting circuit to extract communicated information available about the target user and the number of other users from the electronic communications, an identifying circuit to, based on an analysis of the communicated information available about the target user and the number of other users, identify relevant information that is relevant for updating the profile of the target user on at least one social network, a display to present a number of prompts to the target user to allow the target user to validate the relevant information before updating the profile, and a second server to update the profile of the target user on the at least one social network using the relevant information derived from the analysis.

A machine-readable, non-volatile storage medium encoded with instructions, the instructions executable by a processor of a system to cause the system to access a server through a network interface and monitor electronic communications between a target user and a number of other users in real-time, the server storing the electronic communications, extract communicated information available about the target user and the other user from the electronic communications to create a model, analyze the model, and based on an analysis of the model identifying relevant information from that is useful for updating the profile of the target user on a social network.

BRIEF DESCRIPTION OF THE SEVERAL VIEWS OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Figure 1:
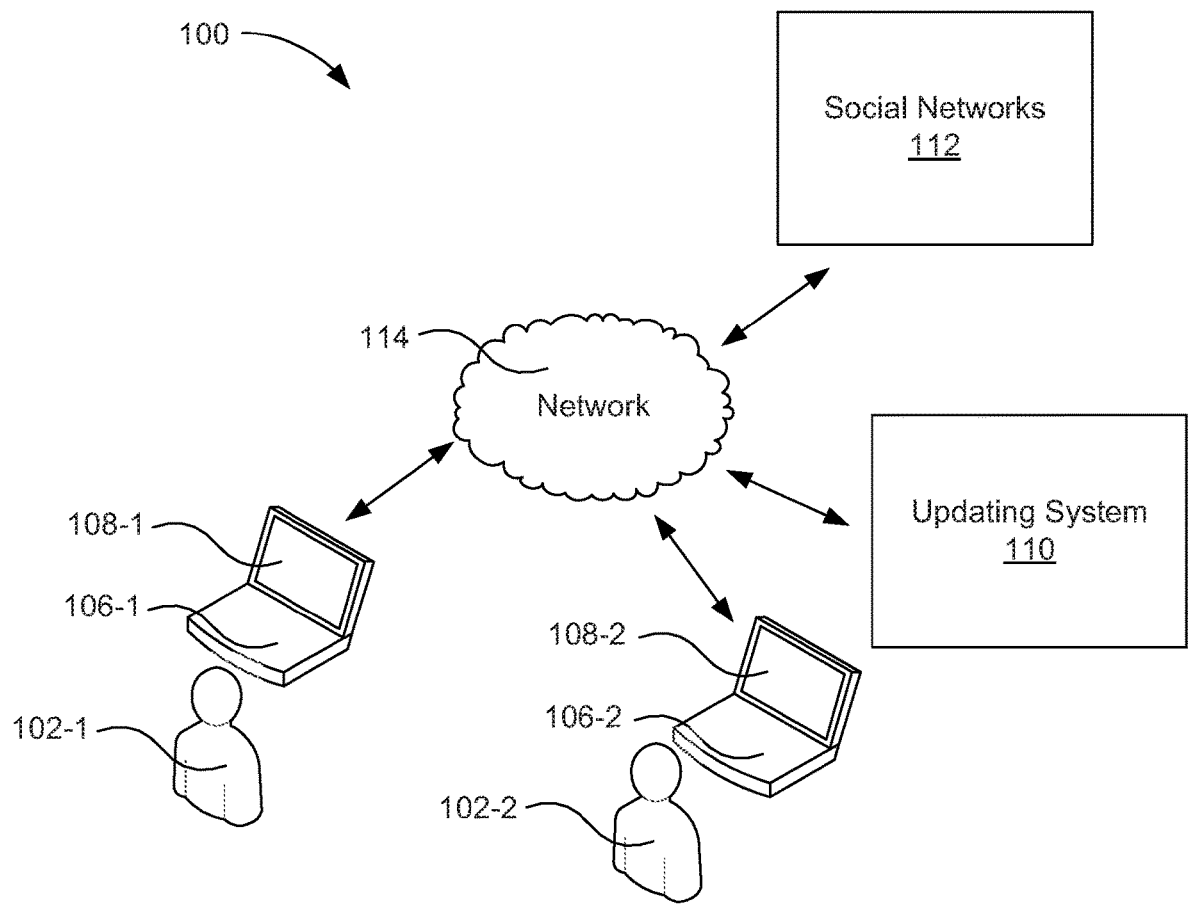
FIG. 1 is a diagram of an example of a system for updating a profile, according to one example of principles described herein.

The present specification describes a method and system for updating a profile, such that the profile of a target user is updated based on relevant information extracted from electronic communication between the target user and other users.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, a social network is a network based application to enable a person to create a user account. Often, the social network includes a profile page for each person that created a user account. For examples, if the social network includes four people, each of the people has a profile page. The profile page may be a visual display of personal data associated with the person. As a result, the profile page is an explicit representation of the person's identity.

To create a profile page, the person manually provides personal data to the social network. The person may provide an image of themselves, a user name, a date of birth, other personal data, and combinations thereof. For each social network that the person is a member of, the person manually provides personal data to each of the social networks. If the person joins several social networks, this may be a burdensome task to manually provide personal data to the social network. As the social networks evolve, the person may need to specify more personal data. As the personal data of the person changes, the person manually provides new personal data to the social network. As a result, the person needs to constantly provide personal data to the social network if the profile page of the person is to be up-to-date.

The principles described herein include a method for updating a profile. Such a method includes with a computer having a network interface and programmed to perform the method, monitoring electronic communications between a target user and a number of other users in real-time, extracting communicated information available about the target user and the number of other users from the electronic communications, based on an analysis of the communicated information available about the target user and the number of other users identifying relevant information from the communicated information that is relevant for updating the profile of the target user on at least one social network, and updating the profile of the target user on the at least one social network using the relevant information derived from the analysis. Such a method allows the profile of the target user to be updated based on relevant information extracted from electronic communication between the target user and other users. As a result, all profiles for all social networks associated with the target user may be updated.

In the present specification and in the appended claims, the term "target user" means a user of a social network whose profile is to be updated. The target user may be an individual or a group of individuals.

In the present specification and in the appended claims, the term "other users" means a user of a social network that exchanges electronic communication with a target user. The other users may be an individual or a group of individuals.

In the present specification and in the appended claims, the term "communicated information" means data extracted from electronic communications. This communicated information may be analyzed to determine relevant information for updating a profile of a target user. The term "relevant information" refers to portions of communicated information that have been determined relevant for updating the profile of a target user in a social network.

In the present specification and in the appended claims, the term "prompt" means relevant information presented to the target user in the form of a questions to allow the target user to select an answer to the question. Once the target user selects an answer, the relevant information is validated accordingly. Once the relevant information is validated, the relevant information may be used to update a profile of a target user.

In the present specification and in the appended claims, the term "model" means a data structure representing electronic communications exchanged between a target user and other users. The target user and the other users may be represented as nodes on the model. Electronic communications exchanged between the target user and the other users is represented as edges on the model.

In the present specification and in the appended claims, the term "analyzing technique" means methods used to extract relevant information from electronic communications for the purpose of updating a profile of the target user on at least one social network. The analyzing techniques may include an in-degree technique, an out-degree technique, a closeness technique, a betweenness technique, an eigenvector centrality technique, or combinations thereof.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

FIG. 1 is a diagram of an example of a system for updating a profile, according to one example of principles described herein. As will be described below, an updating system is in communication with a network to monitor electronic communications between a target user and a number of other users in real-time. The updating system extracts communicated information available about the target user and the number of other users from the electronic communications. The updating system identifies, based on an analysis of the communicated information available about the target user and the number of other users, relevant information from the communicated information that is relevant for updating the profile of the target user on at least one social network. The updating system updates the profile of the target user on the at least one social network using the relevant information derived from the analysis.

In one example, the system (100) includes a number of user devices (106) with displays (108). The user devices (106) may include user device A (106-1) and user device B (106-2). The user devices (106) may allow users (102) to exchange electronic communication with each other. The electronic communication may be in the form of an instant message (IM), an electronic mail (email), a live video, a phone call, a post, or a short message service (SMS).

Each of the user devices (106) may be associated with a user (102). For example, user device A (106-1) may be associated with a target user (102-1). The target user (102-1) may be a user of a social network whose profile is to be updated. The target user (102-1) may be an individual or a group of individuals. User device B (106-2) may be associated with other users (102-2). The other users (102-2) may be a user of a social network that exchanges electronic communication with the target user (102-1). The other users (102-2) may be an individual or a group of individuals. In an example, each of the users (102) uses the user devices (106) to access social networks (112) via a network (114).

The system (100) includes social networks (112). The social networks (112) are network based applications to enable a person, such as the users (102), to create a user account. Once the user account is created, the users (102) establish connections with other users, such as friends, family, and colleagues in an online environment. The users (102) may then collaborate with each other on the social networks (112) via electronic communication by uploading pictures, sharing posts, sending messages, updating status information, and commenting on information posted by others, among other activities. As described below, the social networks (112) include a profile for each of the users (102).

The system (100) includes an updating system (110). The updating system (110) may be in communication with the user devices (106) and the social networks (112) over a network (106).

The updating system (110) monitors electronic communications between the target user (102-1) and the number of other users (102-2) in real-time. The users (102) may interact with each other over various electronic mediums including email, chats and the social network (112) by uploading pictures, sharing posts, sending messages, updating status information, and commenting on information posted by others, among other activities. As a result, the updating system (110) may monitor electronic communications between the target user (102-1) and the number of other users (102-2) on the social networks (112). The updating system (110) may monitor the electronic communications between the target user (102-1) and the number of other users (102-2) on systems outside of the social networks (112). Such systems may include email servers.

The updating system (110) extracts communicated information available about the target user (102-1) and the number of other users (102-2) from the electronic communications. The communicated information may be used to create a model for the analysis.

Further, the updating system (110) identifies, based on an analysis of the communicated information available about the target user and the number of other users, relevant information from the communicated information that is relevant for updating the profile of the target user (102-1) on at least one of the social networks (112). For example, if the social networks (112) include social network A and social network B, the relevant information may be used for updating the profile of the target user (102-1) on social network A if the relevant information pertains to social network A.

The updating system (110) updates the profile of the target user (102-1) on at least one of the social networks (112) using the relevant information derived from the analysis.

This may include updating personal information for the target user (102-1) or making a post on at least one of the social networks (112) for the target user (102-1). Such a system allows the profile of the target user (102-1) to be updated based on relevant information extracted from electronic communication between the target user (102-1) and the other users (102-2). As a result, all profiles associated with the target user (102-1) may be updated. More information about the updating system (110) is described later on in this specification.

While this example has been described with reference to the updating system being located over the network, the updating system may be located in any appropriate location according to the principles described herein. For example, the updating system may be located in a user device, a server, a datacenter, other locations, or combinations thereof.

Figure 2:
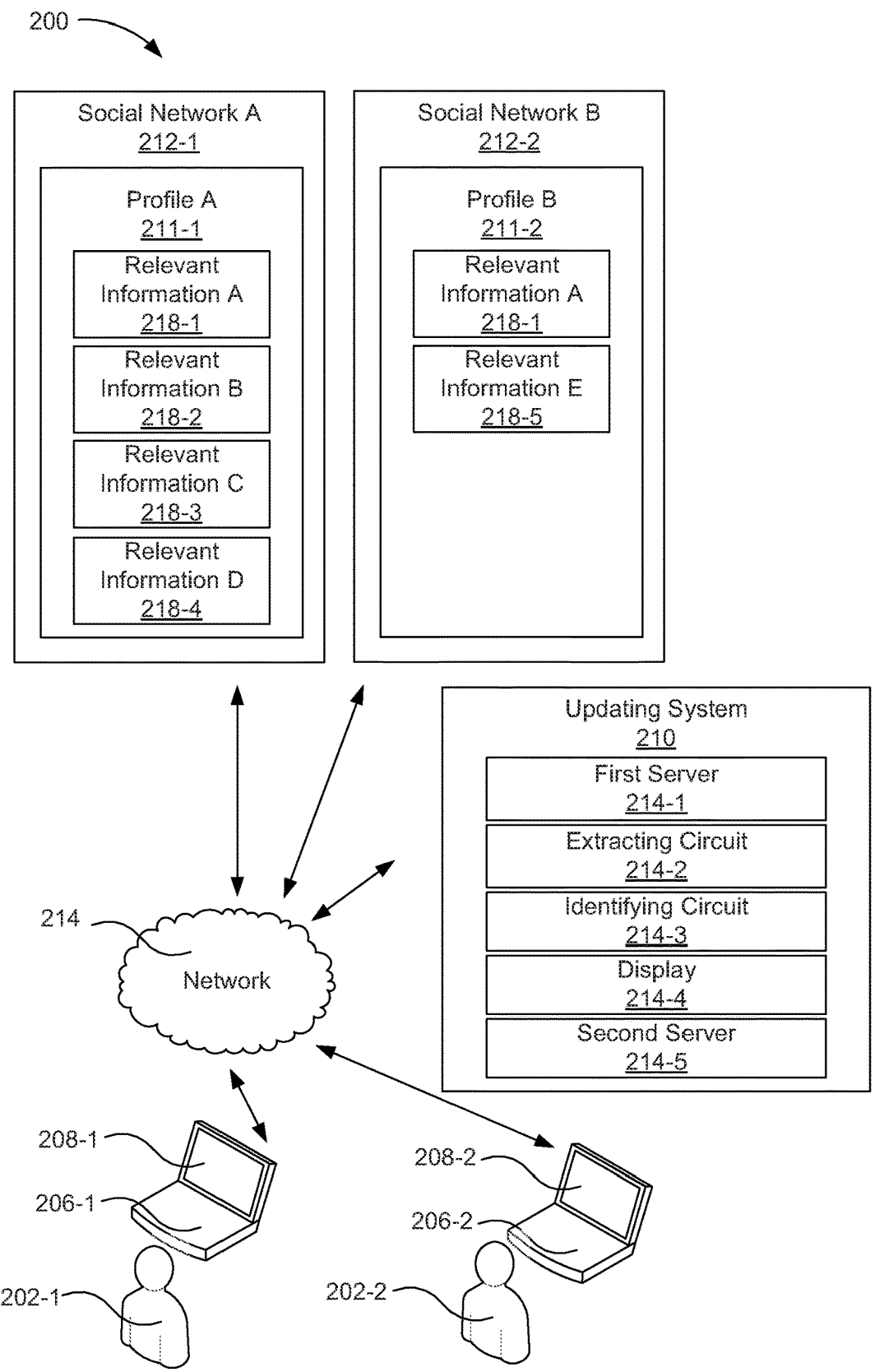
FIG. 2 is a diagram of an example of a system for updating a profile, according to one example of principles described herein.

FIG. 2 is a diagram of an example of a system for updating a profile, according to one example of principles described herein. As described below, an updating system is in communication with a network to monitor electronic communications between a target user and a number of other users in real-time. The updating system extracts communicated information available about the target user and the number of other users from the electronic communications. The updating system identifies, based on an analysis of the communicated information available about the target user and the number of other users, relevant information from the communicated information that is relevant for updating the profile of the target user on at least one social network. The updating system updates the profile of the target user on the at least one social network using the relevant information derived from the analysis.

As illustrated, the system (200) includes a number of social networks (212). For example, the system (200) includes social network A (212-1) and social network B (212-2). The social networks (212) may be for business use or personal use. For example, social network A (212-1) may be a social network that is specific to a company and is for business use. As a result, employees of the company are allowed to create user accounts, update information on social network A (212-1), and post information on social network A (212-1) that pertains to the company. Social network B (212-2) may be a social network that anyone can join. As a result, social network B (212-2) may be for personal use. In some examples, metadata associated with the social networks (212) allow an updating system (210) to determine which social networks (212) are for personal use and/or business use. The metadata may include the name of the social networks, if the target user needs specific credentials to login to the social networks, such as an email address ending in @companyX.com, other metadata, or combinations there. In another example, the target user may specify, via a graphical user interface (GUI), which social networks (212) are for personal use and/or business use. The GUI may present a list of social networks the target user has joined. The list may include social network A and social network B. The target user may specify via a dropdown box, a check box, or a radio button, that social network A is for business use and social network B is for personal use. This allows the updating system (210) to determine if relevant information extracted from electronic communication is to be used to update the target user's profile on social network A (212-1) and/or social network B (212-2).

As noted above, each of the social networks (212) may include profiles (211). For illustrative purposes, only the profiles (211) for the target user (202-1) are illustrated in FIG. 2. In this example, profile A (211-1) may be a profile for the target user (202-1) and may be associated with social network A (212-1). Profile B (211-2) may be a profile for the target user (202-1) and may be associated with social network B (212-2). As described below, relevant information (218) may be used to update the profiles (211) of the target user (202-1) on each of the social networks (212).

The system (200) includes an updating system (210). As described below, the updating system (210) may perform tasks such as monitor electronic communications, create a model, analyze the model, present a prompt, and update at least one of the profiles (211) of the target user (202-1). Some of the tasks may be conducted every time the updating system (210) is activated. Other tasks may be conducted based to an event. The event may include activing the updating system (210) at the discretion of an administrator, at a specific time, when another user mentions a target user (202-1) in electronic communication, other events, or combinations thereof. The tasks may be conducted based on a time. The time may be a specific minute, hour, day, week, or year. The tasks may further be conducted as appropriate as indicated by the specific examples below or by other appropriate factors. In one example, the updating system (210) includes a first server (214-1), an extracting circuit (214-2), an identifying circuit (214-3), a display (214-4), and a second server (214-5).

As noted above, the updating system (210) includes the first server (214-1). The first server (214-1) monitors electronic communications between a target user (202-1) and a number of other users (202-2) in real-time. In some examples, the target user (202-1) and the number of other users (202-2) may be directly exchanging electronic communications. For example, the target user (202-1) may send an email to the number of other users (202-2). In other examples, the target user (202-1) and the number of other users (202-2) may be indirectly exchanging electronic communications. For example, one of the other users (202-2) may send an IM to another one of the other users (202-2). The IM may be about the target user (202-1). In some examples, the first server (214-1) monitors electronic communications at specific times. For example, the first server (214-1) monitors electronic communications every Monday through Friday for each week of the year. In other examples, the first server (214-1) monitors electronic communications when the first server (214-1) receives the electronic communications.

As noted above, the updating system (210) includes the extracting circuit (214-2). The extracting circuit (214-2) extracts communicated information available about the target user (202-1) and the number of other users (202-2) from the electronic communications. The communicated information may be data extracted from electronic communications. For example, the communicated information may include names of the users, topics, or other communicated information. This communicated information may be analyzed to determine relevant information for updating the profiles (211) of the target user (202-1). In an example, a model is crated based on the communicated information. In an example, relevant information A (218-1), relevant information B (218-2), relevant information C (218-3), relevant information D (218-4), and relevant information D (218-4) is extracted from the electronic communications. In an example, the extracting circuit (214-2) extracts the communicated information each time the first server (214-1) receives electronic communication. In other examples, the extracting circuit (214-2) extracts communicated information based on a time. For example, the extracting circuit (214-2) extracts communicated information every Monday of each week of the year.

The system (200) includes the identifying circuit (214-3). The identifying circuit (214-3) to, based on an analysis of the communicated information available about the target user and the number of other users, identify relevant information that is relevant for updating the profiles (211) of the target user (202-1) on at least one social network (212). Relevant information may refer to portions of communicated information that have been determined relevant for updating the profiles (211) of the target user (202-1) in a social network (212). For example, the communicated information may have a portion that is directed towards user A. The communicated information may have a portion that is directed towards user B. The communicated information may have a portion that is directed towards the target user (202-1). As a result, the communicated information that has the portion that is directed towards the target user (202-1) may be relevant information (218). As described below, the communicated information may be used to create a model. The target user (202-1) and the number of other users (202-2) are represented as nodes on the model, and the electronic communications between the target user (202-1) and the number of other users (202-2) are represented as edges, in an example, the edges on the model are weighted.

In an example, the display (214-4) is used to present a number of prompts to the target user (202-1) to allow the target user (202-1) to validate the relevant information before updating the profiles (211) of the target user (202-1). The prompt may be relevant information presented to the target user (202-1) in the form of a question to allow the target user (202-1) to select an answer to the question. Once the target user (202-1) selects an answer, the relevant information is validated accordingly. Once the relevant information is validated, the relevant information may be used to update a profile of the target user (202-1). In an example, display A (208-1) associated with user device A (206-1) may be used to present a number of prompts to the target user (202-1). In another example, the display (214-4) of the updating system (210) may be used to present a number of prompts to the target user (202-1). As described below, the number of prompts are created by summarizing the relevant information.

The system (200) includes the second server (214-5). The second server (214-5) updates the profiles (211) of the target user (202-1) on at least one of the social networks (212) using the relevant information (218) derived from the analysis. For example, the second server (214-4) updates profile A (1-1) on social network. A (212-1) with relevant information A (218-1), relevant information B (218-2), relevant information C (218-3), and relevant information D (218-4). Further, the second server (214-4) updates the profile B (211-2) on social network B (212-2) with relevant information A (218-1) and relevant information E (218-5).

An overall example of FIG. 2 will now be described. The first server (214-1) monitors electronic communications between the target user (202-1) and the number of other users (202-2) in real-time. In an example, the target user (202-1) sends an email to the other users (202-2). The extracting circuit (214-2) extracts communicated information available about the target user (202-1) and the number of other users (202-2) from the electronic communications. The communicated information may be about a birth of the target user's child. The identifying circuit (214-3) identifies, based on an analysis of the communicated information available about the target user (202-1) and the number of other users (202-2), relevant information that is relevant for updating the profiles (211) of the target user (202-1) on at least one of the social networks (212). The relevant information may be the name of the child, the sex of the child, the weight of the child, the height of the child, and the day of the birth. The display (214-4) presents a number of prompts to the target user (202-1) to allow the target user (202-1) to validate the relevant information before updating the profiles (211). For example, the prompts may ask the target user (202-1) if the child's name is Charlotte, if the sex of the child is female, if the weight of the child is 7 pounds, if the length of the child is 19 inches, and the day of the birth is October $20^{th}$. The target user (202-1) may validate this relevant information as being correct or incorrect by selecting a yes or no option that is presented in the prompt. The second server (214-5) updates the profiles (211) of the target user (202-1) on the social networks (212) using the relevant information (218) derived from the analysis. In this example, the name of the child may be relevant information A (218-1), the sex of the child may be relevant information B (218-2), the weight of the child may be relevant information C (218-3), the height of the child may be relevant information D (218-4), and the day of the birth may be relevant information E (218-5). As a result, both of the profiles (211) of the target user (202-1) are updated on both social networks (212).

Figure 3:
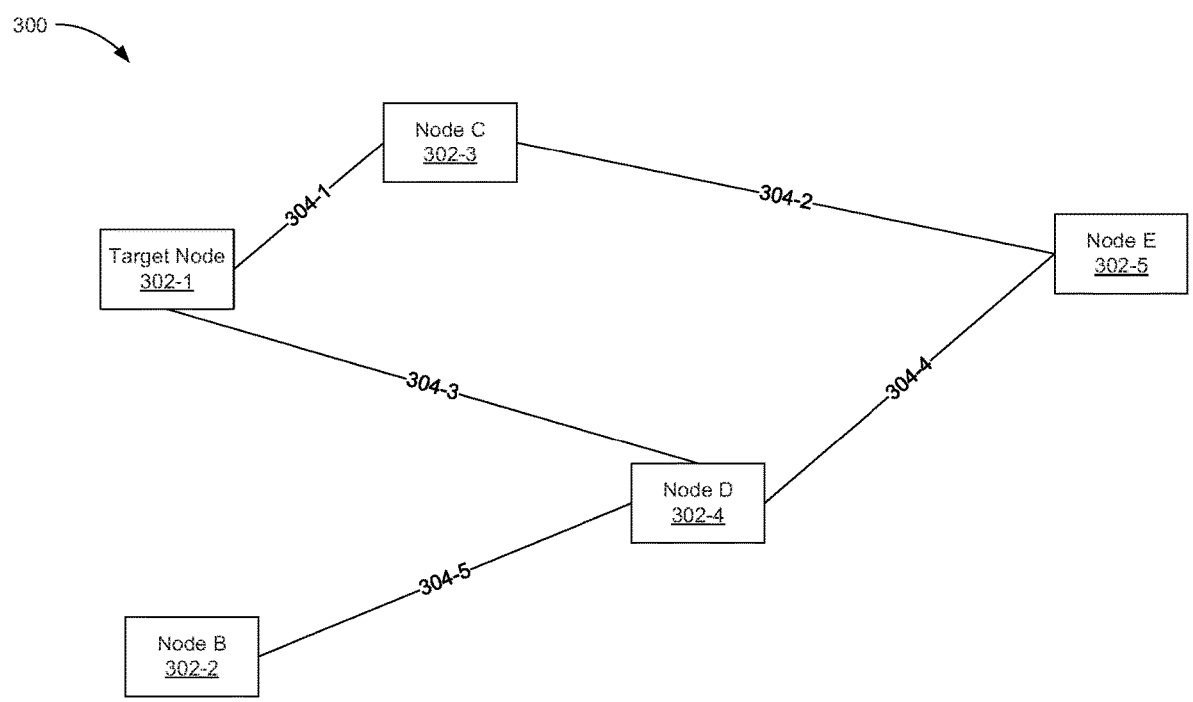
FIG. 3 is a diagram of an example of a model, according to one example of principles described herein.

FIG. 3 is a diagram of an example of a model, according to one example of principles described herein. As will be described below, a model includes a number of nodes and a number of edges.

In an example, the model (300) may be a data structure representing electronic communications exchanged between a target user and other users. The target user and the other users may be represented as nodes (302) on the model (300). For example, the model (300) includes a target node (302-1), node B (302-2), node C (302-2), node D (302-4), and node E (302-5). In an example, the target node (302-1) may be associated with a target user. Node B (302-2), node C (302-2), node D (302-4), and node E (302-5) may be associated with other user. For example, node B (302-2) may be associated with user B. Node C (302-2) may be associated with user C. Node D (302-4) may be associated with user D. Node E (302-5) may be associated with user E. As a result, node B (302-2), node C (302-2), node D (302-4), and node E (302-5) may be neighboring node with respect to the target node (302-1).

The electronic communications exchanged between the target user and the other users is represented as edges (304) on the model (300). For example, edge A (304-1) may represent electronic communications exchanged between the target user and user C. Edge B (304-2) represents electronic communications exchanged between user C and user E. Edge C (304-3) represents electronic communications exchanged between the target user and user D. Edge D (304-4) represents electronic communications exchanged between user E and user D. Edge E (304-5) represents electronic communications exchanged between user D and user B.

The target node (302-1) associated with the target user may be directly connected to neighboring nodes on the model (300). For example, the target node (302-1) may be directly connected to node C (302-3) via edge A (304-1) and directly connected to node D (302-4) via edge C (304-3). As a result, the target user has directly exchanged electronic communications with user C and user D.

The target node (302-1) associated with the target user may be indirectly connected to neighboring nodes on the model (300). For example, the target node (302-1) may be indirectly connected to node E (302-5) via edge B (304-2) or edge D (304-4) and indirectly connected to node B (302-2) via edge E (304-5). As a result, the target user has indirectly exchanged electronic communications with user B and user E.

In an example, the edges (304) may be weighted. The weight of the edges (304) may be used to identify the relevant information. In another example, the weight may be used to identify the frequency in which the users exchange electronic communication. More information about the weight will be described below.

As noted above, the updating system (210) extracts communicated information available about the target user and the other user from the electronic communications to create the model (100). The model (300) may be analyzed. Based on an analysis of the model (300), the updating system (210) identifies relevant information from that is useful for updating the profile of the target user on a social network.

In an example, the analysis identifies, from the model (300), neighboring nodes connected directly or indirectly to the target node (302-1), the neighboring nodes corresponding to the other users and the target node (302-1) corresponding to the target user. The neighboring nodes may be identified as described above. As a result, all users corresponding to the social network or social networks may be analyzed.

The analysis analyzes the neighboring nodes and the target node (302-1) to determine, the relevant information via analyzing techniques. In an example, the analyzing techniques include an in-degree technique, an out-degree technique, a closeness technique, a betweenness technique, an eigenvector centrality technique, or combinations thereof. This allows for intelligent pairing of users based on their behavior. The data can be used to produce equivalence classes between users. This allows for the opportunity of see how specific users interact with social media and how the target user compares with the other users. Depending on the detail of this data, the updating system (210) may use this information to adapt user profiles or recommend connections between specific users.

In an example, the in-degree technique determines how many edges (304) point to the target node (302-1). In an example, the edges (304) that point to the target node (302-1) represent electronic communication received by the target user. In an example, edge A (304-1) points to the target node (302-1). As a result, one edge points to the target node (302-1). This allows the updating system (210) to understand which users have sent an electronic communication to the target user. In this example, the updating system (210) determines that user C has sent an electronic communication to the target user. This may allow the updating system (210) to determine relationships between the users. For example, user C, associated with node C (302-3) exchanges electronic communication with the target user, associated with the target node (302-1). The target user then forwards these electronic communications to user D associated with node D (302-4). This starts a relationship between user C and user D which can now be identified by the updating system (210) using the in-degree technique. Depending on the contents and/or the relevant information in the electronic communications, the relationship may be identified as a family relationship such as brother and sister, a personal relationship such as friend, or a professional relationship such as boss, employee, or client. In some examples, by using the in-degree technique, the updating system (210) may present a prompt to the target user to suggest a relationship between the target user, user C and user D.

In an example, the out-degree technique, determines how many edges (304) point away from the target node (302-1). In an example, the edges (304) that point away from the target node (302-1) represent electronic communication sent by the target user to another user. In an example, edge C (304-3) points away from the target node (302-1). As a result, one edge points away from the target node (302-1). This allows the updating system (210) to understand which user the target user has sent an electronic communication to. In this example, the updating system (210) determines that the target user has sent an electronic communication to user D. This may allow the updating system (210) to determine relationships between the users similar to the in-degree technique described above. In some examples, by using the out-degree technique, the updating system (210) may present a prompt to the target user to suggest a relationship between the target user and user D.

In an example, the closeness technique determines how long it will take to spread information from one node to all other nodes. This may determine the path that electronic communication may take from one node to all the other nodes. For example, some users are more likely to pass along electronic communication from one user to another user more quickly than other users. This allows be updating system (210) to determine which users passes along electronic communication quickly. This may allow the updating system (210) to determine relationships between the users. In an example, relationships between users may be identified by analyzing selected patterns of electronic communication against known patterns of electronic communication. For example, a known pattern of electronic communication may be as follows: user C, associated with node C (302-3), sends electronic communications to the target user associated with the target node (302-1) and user E associated with node E (302-5). However, user C may send one electronic communication to the target user, user F and user D associated with node D (302-4). This may be a selected pattern of electronic communication that may be analyzed to determine if a relationship between user C and user D exists. In some examples, analyzing selected patterns of electronic communication against known patterns of electronic communication may include how many times the selected pattern occurs. For example, if this selected pattern occurs more than once, a relationship between user C and user D exists. As a result, a weight that is associated with an edge connecting node C (302-3) to node D (302-4) may be increased each time an electronic communication is exchanged between user C and user D. However, if this selected pattern occurs once, there is not a relationship between user C and user D. As a result, the weight that is associated with the edge connecting node C (302-3) to node D (302-4) may remain the same. In some examples, by using the closeness technique, the updating system (210) may present a prompt to the target user to suggest a relationship between the target user and the other users.

In an example the betweenness technique may be used to quantify the number of times a node acts as a bridge along the shortest path between two other nodes. The more times a node acts as a bridge along the shortest path between two other nodes the more likely the node has access to more users. This may allow the updating system (210) to determine relationships between the users. For example, riser B associated with node B (302-2) is an expert in their field of employment. This results in user B exchanging electronic communication with other users, in an example, when the updating system (210) analyzes node B (302-2), the updating system (210) will give node B (302-2) more weight in determining the shortest path between the other nodes. As a result, when the target user or any of the other nodes exchange electronic communication with user 13, a relationship is quickly established given the importance of user B. In some examples, by using the betweenness technique, the updating system (210) may present a prompt to the target user to suggest a relationship between the target user and the other users.

In an example the eigenvector centrality technique is a measure of an influence of a node on the model (300). For example, some nodes may be more influential in passing along electronic communication. This may allow the updating system (210) to determine relationships between the users. In some examples, by using the eigenvector centrality technique, the updating system (210) may present a prompt to the target user to suggest a relationship between the target user and the other users. As a result, these analyzing techniques allow the updating system (210) to understand relationships between the users and the users themselves as well as determine relevant information.

Figure 4A:
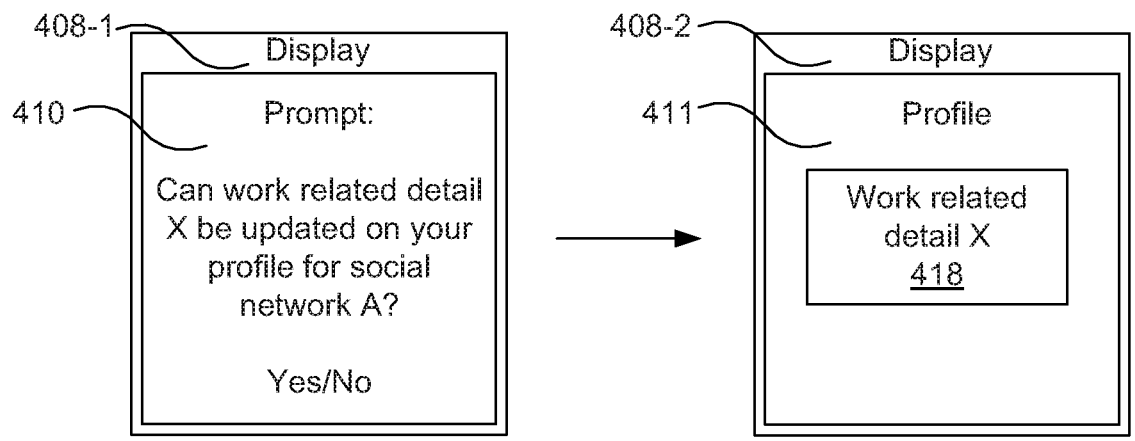
FIG. 4A is a diagram of an example of a prompt, according to one example of principles described herein.

FIG. 4A is a diagram of an example of a prompt, according to one example of principles described herein. As will be described below, a prompt is presented to a target user via a display.

As illustrated, a prompt (410) is presented to a target user on a display (408-1). As noted above, relevant information is presented to the target user in the form of a question to allow the target user to select an answer to the question. In this example, the prompt (410) states, "Can work related detail X be updated on your profile for social network A?" The prompt (410) allows the target user to validate this relevant information by selecting an answer. In this example, the answer that can be selected is yes or no. Once the target user selects an answer the relevant information is validated accordingly. For example, if the target user selects no, this relevant information is either not correct or shouldn't be updated on the target user's profile for social network A. As a result, this relevant information is not updated on social network A. However, if the target user selects yes, this relevant information is correct and should be updated on the target user's profile for social network A. As a result, this relevant information is updated on social network A. In this example, the target user validates this relevant information by selecting yes and this relevant information is updated on the target user's profile accordingly. As a result, the display (408-2) displays work related detail X (418) on the profile (411) of the target user.

While this example has been described with reference to the target user validating relevant information by selecting a yes or no option that is presented in the prompt, the prompt may display other options. The other options may include options such as this relevant information is incorrect, this relevant information should be uploaded to social network A instead of social network B, other options, or combinations thereof.

Figure 4B:
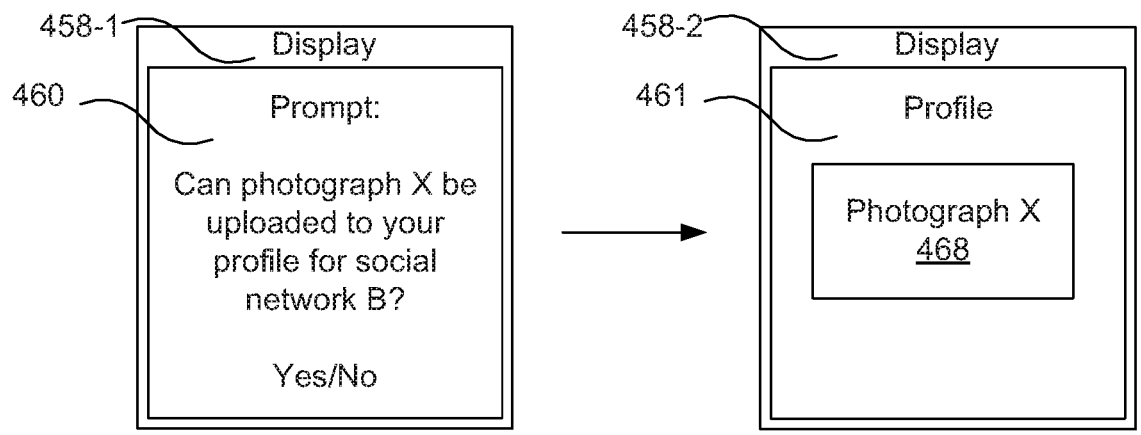
FIG. 4B is a diagram of an example of a prompt, according to one example of principles described herein.

FIG. 4B is a diagram of an example of a prompt, according to one example of principles described herein. As will be described below, a prompt is presented to a target user via a display.

As illustrated, a prompt (460) is presented to a target user on a display (458-1). As noted above, relevant information is presented to the target user in the form of a question to allow the target user to validate this relevant information by selecting an answer to the question. In this example, the prompt (460) states, "Can photograph X be updated to your profile for social network B?" The prompt (460) allows the target user to validate this relevant information, such as photograph X (468), by selecting an answer. In this example, the answer that can be selected is yes or no. Once the target user selects an answer the relevant information is validated accordingly. For example, if the target user selects no, photograph X (468) is not uploaded to the profile (461) of the target user. However, if the target user selects yes, photograph X (468) is uploaded to the profile (461) to update the profile (461) of the target user on the social network. In this example, the target user selects yes and photograph X (468) is uploaded to the profile (461). As a result, the display (458-2) displays photograph X (468) on the profile (461) of the target user.

Figure 5:
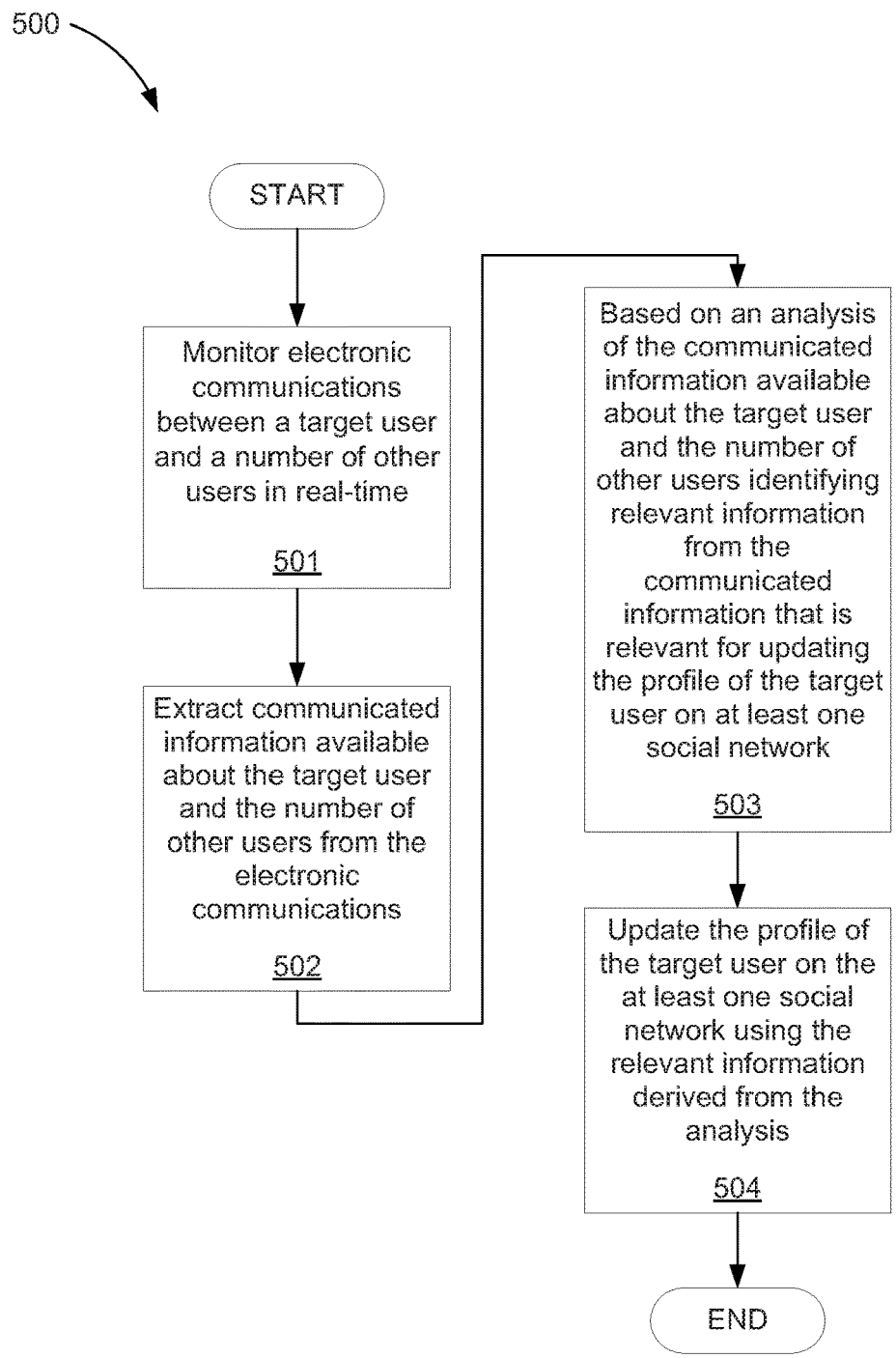
FIG. 5 is a flowchart of an example of a method for updating a profile, according to one example of principles described herein.

FIG. 5 is a flowchart of an example of a method for updating a profile, according to one example of principles described herein. The method (500) may be executed by the system (100) of FIG. 1. The method (500) may be executed by other systems such as system 200, system 710, or system 800. In this example, the method (500) includes with a computer having a network interface and programmed to perform the method (500) monitoring (501) electronic communications between a target user and a number of other users in real-time, extracting (502) communicated information available about the target user and the number of other users from the electronic communications, based on an analysis of the communicated information available about the target user and the number of other users identifying (503) relevant information from the communicated information that is relevant for updating the profile of the target user on at least one social network, and updating (504) the profile of the target user on the at least one social network using the relevant information derived from the analysis.

As mentioned above, the method (500) includes monitoring electronic communications between a target user and a number of other users in real-time. The electronic communication may be in the form of an IM, an email, a live video, a phone call, a post, or a SMS. As a result, the electronic communications may be unstructured data or structured data.

As mentioned above, the method (500) includes extracting (502) communicated information available about the target user and the number of other users from the electronic communications. The communicated information available about the target user and the number of other users from the electronic communications may be extracted via keywords or natural processing language (NLP). This communicated information may be used to create a model as described above.

As mentioned above, the method (500) includes based on an analysis of the communicated information available about the target user and the number of other users identifying (503) relevant information from the communicated information that is relevant for updating the profile of the target user on at least one social network. In an example, the analysis includes identifying, from the model, neighboring nodes connected directly or indirectly to a target node, the neighboring nodes corresponding to the other users and the target node corresponding to the target use and analyzing the neighboring nodes and the target node to determine the relevant information via analyzing techniques. The analyzing techniques may include an in-degree technique, an out-degree technique, a closeness technique, a betweenness technique, an eigenvector centrality technique, or combinations thereof. As noted above, these analyzing techniques may be used to also determine a relationship between users. As a result, the relevant information may be a relationship.

As mentioned above, the method (500) includes updating (504) the profile of the target user on the at least one social network using the relevant information derived from the analysis. In an example, the profile of the target user on the at least one social network using the relevant information derived from the analysis based on user preferences specified by the target user. For example, if social network A is a business social network, relevant information relating to a business may be used to update the target user's profile. If social network B is a personal social network, relevant information relating to the personal life of the target user may be used to update the target user's profile.

In some examples, the relevant information is formatted for each social network. For example, if social network A as a specific format, the relevant information may be formatted accordingly.

Figure 6:
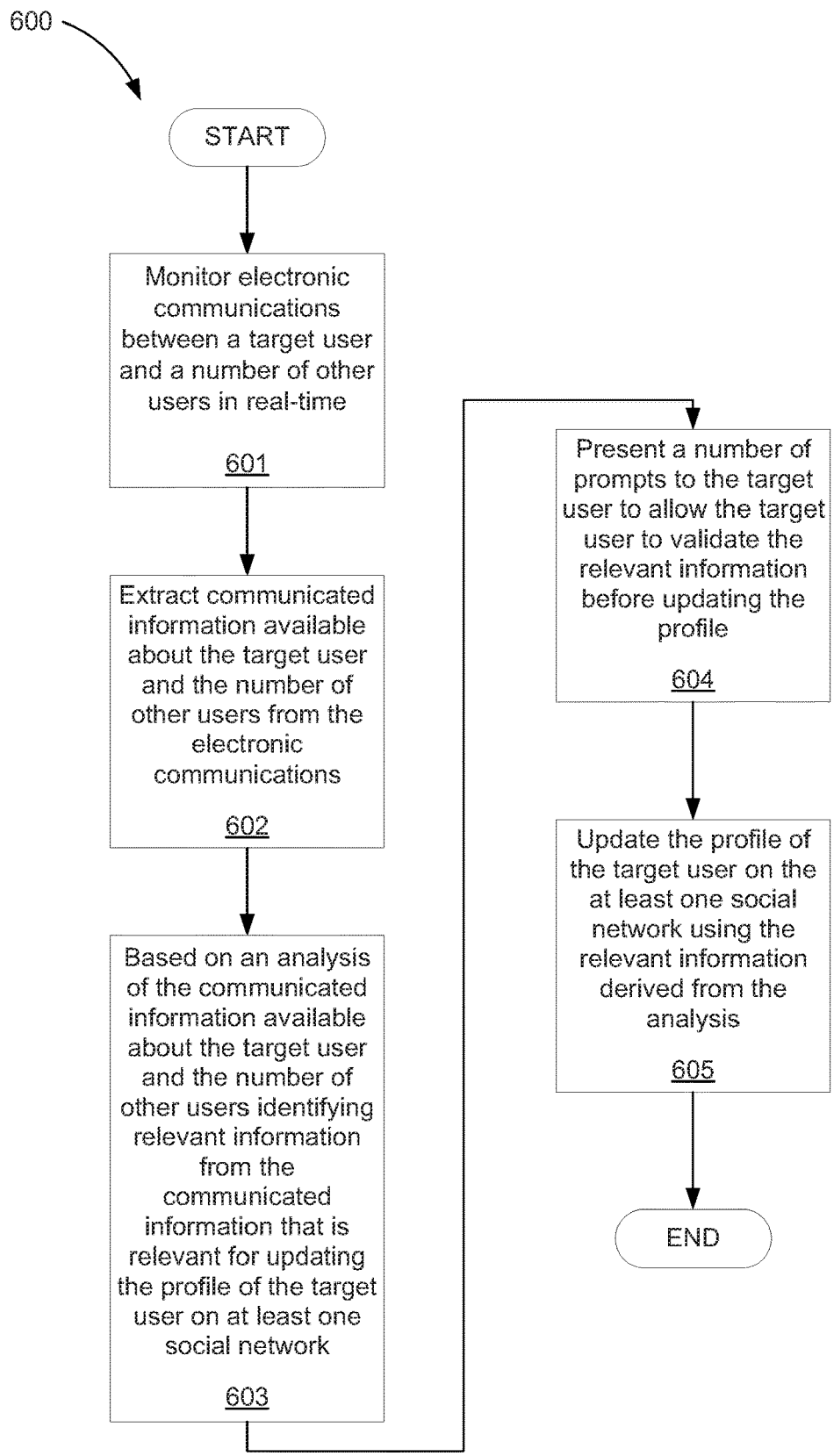
FIG. 6 is a flowchart of an example of a method for updating a profile, according to one example of principles described herein.

FIG. 6 is a flowchart of an example of a method for updating a profile, according to one example of principles described herein. The method (600) may be executed by the system (100) of FIG. 1. The method (600) may be executed by other systems such as system 200, system 710, or system 800. In this example, the method (600) includes with a computer having a network interface and programmed to perform the method monitoring (601) electronic communications between a target user and a number of other users in real-time, extracting (602) communicated information available about the target user and the number of other users from the electronic communications, based on an analysis of the communicated information available about the target user and the number of other users identifying (603) relevant information from the communicated information that is relevant for updating the profile of the target user on at least one social network, presenting (604) a number of prompts to the target user to allow the target user to validate the relevant information before updating the profile, and updating (605) the profile of the target user on the at least one social network using the relevant information derived from the analysis.

As mentioned above, the method (600) includes presenting (604) a number of prompts to the target user to allow the target user to validate the relevant information before updating the profile. In an example, the method (600) presents a prompt to the target user based on an event. The event may include an exchange of electronic communication that is about the target user.

In an example, the number of prompts are created by summarizing the relevant information. In some examples, NLP is used to summarize the relevant information. The NLP may extract specific words form the relevant information and form those specific words into a sentence or two. For example, if the relevant information includes specific detail about event x, the NLP may summarize the relevant information such that the prompt may ask the user if they attended event X.

Figure 7:
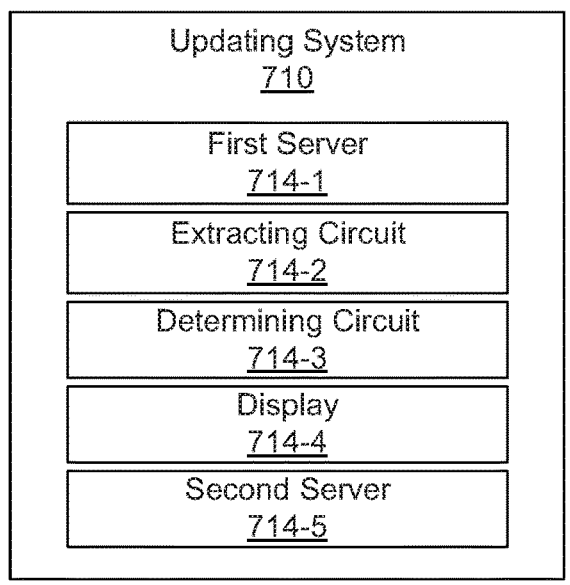
FIG. 7 is a diagram of an example of an updating system, according to the principles described herein.

FIG. 7 is a diagram of an example of an updating system, according to the principles described herein. The updating system (710) includes a first server (714-1), an extracting circuit (714-2), an identifying circuit (714-3), a display (714-4), and a second server (714-5).

The first server (714-1) monitors electronic communications between a target user and a number of other users in real-time. The first server (714-1) monitors specific electronic communications between a target user and a number of other users in real-time. The first server (714-1) monitors all electronic communications between a target user and a number of other users in real-time.

The extracting circuit (714-2) extracts communicated information available about the target user and the number of other users from the electronic communications. The extracting circuit (714-2) extracts communicated information available about the target user and the number of other users from specific electronic communications. The extracting circuit (714-2) extracts communicated information available about the target user and the number of other users from all electronic communications.

The identifying circuit (714-3), based on an analysis of the communicated information available about the target user and the number of other users, identifies relevant information from the communicated information that is relevant for updating the profile of the target user on a social network. The identifying circuit (714-3), based on an analysis of the communicated information available about the target user and the number of other users identifies relevant information from the communicated information that is relevant for updating the profiles of the target user on several social networks.

The display (714-4) presents a prompt to the target user to allow the target user to validate the relevant information before updating the profile. The display (714-4) presents several prompts to the target user to allow the target user to validate the relevant information before updating the profile.

The second server (714-5) updates the profile of the target user on one social network using the relevant information derived from the analysis. The second server (714-5) updates several profiles of the target user on several social networks using the relevant information derived from the analysis.

Figure 8:
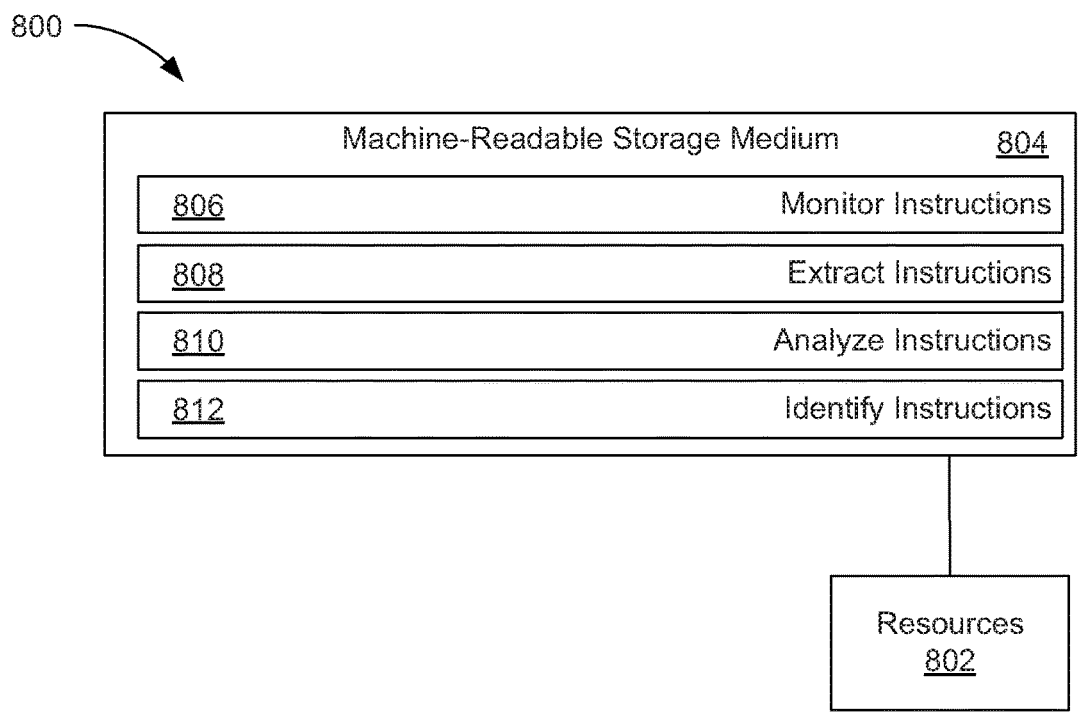
FIG. 8 is a diagram of an example of an updating system, according to the principles described herein.

FIG. 8 is a diagram of an example of an updating system, according to the principles described herein. In this example, the updating system (800) includes resource(s) (802) that are in communication with a machine-readable storage medium (804). Resource(s) (802) may include one processor. In another example, the resource(s) (802) may further include at least one processor and other resources used to process instructions. The machine-readable storage medium (804) represents generally any memory capable of storing data such as instructions or data structures used by the updating system (800). The instructions shown stored in the machine-readable storage medium (804) include monitor instructions (806), extract instructions (808), analyze instructions (810), and identify instructions (812).

The machine-readable storage medium (804) contains computer readable program code to cause tasks to be executed by the resource(s) (802). The machine-readable storage medium (804) may be tangible and/or physical storage medium. The machine-readable storage medium (804) may be any appropriate storage medium that is not a transmission storage medium. A non-exhaustive list of machine-readable storage medium types includes non-volatile memory, volatile memory, random access memory, write only memory, flash memory, electrically erasable program read only memory, or types of memory, or combinations thereof.

The monitor instructions (806) represents instructions that, when executed, cause the resource(s) (802) to access a server through a network interface and monitor electronic communications between a target user and a number of other users in real-time, the server storing the electronic communications. The extract instructions (808) represents instructions that, when executed, cause the resource(s) (802) to extract communicated information available about the target user and the other user from the electronic communications to create a model.

The analyze instructions (810) represents instructions that, when executed, cause the resource(s) (802) to analyze the model. The identify instructions (812) represents instructions that, when executed, cause the resource(s) (802) to based on an analysis of the model identify relevant information from that is useful for updating the profile of the target user on a social network.

Further, the machine-readable storage medium (804) may be part of an installation package. In response to installing the installation package, the instructions of the machine-readable storage medium (804) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the resource(s) (802) and the machine-readable storage medium (804) are located within the same physical component, such as a server, or a network component. The machine-readable storage medium (804) may be part of the physical component's main memory, caches, registers, non-volatile memory, or elsewhere the physical component's memory hierarchy. Alternatively, the machine-readable storage medium (804) may be in communication with the resource(s) (802) over a network. Further, the data structures, such as the libraries, may be accessed from a remote location over a network connection while the programmed instructions are located locally. Thus, the updating system (800) may be implemented on a user device, on a server, on a collection of servers, or combinations thereof.

The updating system (800) of FIG. 8 may be part of a general purpose computer. However, in alternative examples, the updating system (800) is part of an application specific integrated circuit.

The preceding description has been presented to illustrate and describe examples of the principles described. This description is not intended to be exhaustive or to limit these principles to any precise form disclosed. Many modifications and variations are possible in light of the above teaching.

The flowchart and block diagrams in the figures illustrate the architecture, functionality, and operations of possible implementations of systems, methods, and computer program products. In this regard, each block in the flowchart or block diagrams may represent a module, segment, or portion of code, which has a number of executable instructions for implementing the specific logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combination of blocks in the block diagrams and/or flowchart illustration, can be implemented by special purpose hardware-based systems that perform the specified functions or acts, or combinations of special purpose hardware and computer instructions.

The terminology used herein is for the purpose of describing particular examples, and is not intended to be limiting. As used herein, the singular forms "a," "an" and "the" are intended to include the plural forms as well, unless the context clearly indicated otherwise. It will be further understood that the terms "comprises" and/or "comprising" when used in the specification, specify the presence of stated features, integers, operations, elements, and/or components, but do not preclude the presence or addition of a number of other features, integers, operations, elements, components, and/or groups thereof.

What is claimed is:

1. A computer program product for updating a profile on a social network, the computer program product comprising a non-transitory computer-readable medium with instructions that, when executed by a computer comprising a server and having a network interface for communicating with a computer network, causes the computer in:

with the network interface, monitor electronic communications between a target user and a number of other users occurring on the computer network;

extract communicated information available about the target user and the number of other users from the electronic communications;

with the network interface, access at least one social network available on the computer network to obtain information from a profile of the target user on each social network;

based on an analysis of the communicated information available about the target user and the number of other users, identify relevant information from the communicated information that replaces older information already in the profile of the target user and so is relevant for updating the profile of the target user on a particular social network, the profile comprising a visual display of personal data associated with the target user for presentation to other users of the social network;

access metadata associate with the social network using the network interface, and determining from the metadata associated with the social network whether the social network is designated for personal use or business use; and, when a type of the relevant information, as between personal or business information, matches the designated use of the social network, update the profile of the target user on that social network with the relevant information, including updating the older information already in the profile of the target user on that social network using the relevant information derived from the analysis; and continually update the profile of the target user with relevant information extracted from further electronic communications so that information in the profile of the target user remains current for other users of the social network.

2. The computer program product of claim 1, wherein the communicated information is used to create a model for the analysis, the target user and the number of other users are represented as nodes on the model, and the electronic communications between the target user and the number of other users are represented as edges on the model.

3. The computer program product of claim 2, wherein the edges on the model are weighted.

4. The computer program product of claim 1, wherein the analysis comprises:

identifying, from a model, neighboring nodes connected directly or indirectly to a target node, the neighboring nodes corresponding to the other users and the target node corresponding to the target user; and analyzing the neighboring nodes and the target node to determine the relevant information via analyzing techniques.

5. The computer program product of claim 1, further comprising instructions for presenting a number of prompts to the target user to allow the target user to validate the relevant information before updating the profile.

6. The computer program product of claim 5, wherein the number of prompts are created by summarizing the relevant information.

7. A computer program product for updating a profile on a social network, the product comprising a non-transitory computer-readable medium with instructions executable by a computer having a network interface for communicating with a computer network, the instructions, when executed, causing the computer to perform:
- accessing a server through a network interface and monitoring electronic communications between a target user and a number of other users in real-time, the server storing the electronic communications;
- extracting and analyzing communicated information available about the target user and the other user from the electronic communications to create a model;
- analyzing the model;
- based on an analysis of the model, identifying relevant information for updating the profile of the target user on a social network;
- determining from metadata associated with the social network whether the social network is designated for personal use or business use; and,
- when a type of the relevant information, as between personal or business information, matches the designated use of the social network, updating the profile of the target user on the social network with the relevant information.

8. The computer program product of claim 7, further comprising instructions that, when executed, cause the processor to present a number of prompts to the target user to allow the target user to validate the relevant information before updating the profile.

9. The computer program product of claim 7, wherein the target user and the number of other users are represented as nodes on the model.

10. The computer program product of claim 7, wherein the electronic communications between the target user and the number of other users are represented as edges on the model.

11. The computer program product of claim 10, wherein the edges on the model are weighted.

12. The computer program product of claim 10, wherein analysis of the communicated information comprises determining how many edges point to the node representing the target user.

13. The computer program product of claim 10, wherein analysis of the communicated information comprises determining how many edges point away from the node representing the target user.

14. The computer program product of claim 10, wherein analysis of the communicated information comprises determining a time required to spread information from one node to all other nodes.

15. The computer program product of claim 10, wherein analysis of the communicated information comprises quantifying a number of times a node acts as a bridge along a shortest path between two other nodes.

16. The computer program product of claim 10, wherein analysis of the communicated information comprises determining a measure of influence that a user associated with a node in the model has over other users represented.

17. The computer program product of claim 7, further comprising instructions for extracting additional relevant information for updating the profile from a communication between two other users that is not including but is about the target user.

* * * * *